United States Patent
No et al.

(10) Patent No.: US 6,738,090 B2
(45) Date of Patent: *May 18, 2004

(54) SYSTEM AND METHOD FOR USING A SINGLE INTELLIGENCE CIRCUIT FOR A PLURALITY OF IMAGING RENDERING COMPONENTS

(75) Inventors: Young No, Pittsford, NY (US); Timothy F. Donahue, Mendon, NY (US); Keith A. Hadley, Rochester, NY (US); Christopher Rueby, North Chili, NY (US); Alan J. Swire, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 85 days.

This patent is subject to a terminal disclaimer.

(21) Appl. No.: 09/054,770

(22) Filed: Apr. 3, 1998

(65) Prior Publication Data

US 2003/0038880 A1 Feb. 27, 2003

Related U.S. Application Data (63) Continuation-in-part of application No. 08/956,989, filed on Oct. 23, 1997.

(51) Int. Cl.⁷ .............................................. H04N 5/225
(52) U.S. Cl. ............................. 348/207.11; 348/207.2
(58) Field of Search ................................. 348/207, 233, 348/232, 231, 333.02, 333.07, 375, 552, 207.99, 231.7, 231.8, 231.9, 231.99, 207.1, 207.11, 207.2; 358/909.1, 906; 347/133

(56) References Cited

U.S. PATENT DOCUMENTS

| | | |
|---|---|---|
| 4,281,909 A | 8/1981 | Ishibashi et al. |
| 4,803,554 A | 2/1989 | Pape |
| 4,887,161 A | 12/1989 | Watanabe et al. |
| 4,914,746 A | 4/1990 | Nishi et al. |
| 4,937,676 A | 6/1990 | Finelli et al. |
| 5,231,501 A | 7/1993 | Sakai |
| 5,488,558 A | 1/1996 | Ohki |
| 5,493,332 A | 2/1996 | Dalton et al. |
| 5,506,617 A | 4/1996 | Parulski et al. |
| 5,696,850 A | 12/1997 | Parulski et al. |
| 5,790,193 A * | 8/1998 | Ohmori ..................... 348/231 |
| 5,796,428 A | 8/1998 | Matsumoto et al. |
| 6,118,929 A * | 9/2000 | Kawamura et al. ......... 358/906 |
| 6,256,063 B1 | 7/2001 | Saito et al. |

FOREIGN PATENT DOCUMENTS

| | | |
|---|---|---|
| EP | 0 382 044 A | 8/1990 |
| EP | 0 675 648 A2 | 10/1995 |

* cited by examiner

*Primary Examiner*—Aung S. Moe
(74) *Attorney, Agent, or Firm*—Walter S. Stevens; Norman Rushefsky (57) ABSTRACT

An electronic imaging system and method are provided that include an image capturing component, such as a digital camera, an image rendering component, such as a printer, digital projector, video screen, etc., each of which requires an intelligence circuit for operation, and an intelligence module detachably connectable to either of the imaging components for providing the required control circuit. The intelligence module includes a microprocessor and memory, and each of the image capturing and rendering components of the system includes a memory for storing operating instructions. The intelligence module downloads the operating instructions of the particular imaging component it is connected to in order to operate the same. The use of a single control module to operate a broad spectrum of digital imaging components advantageously simplifies the circuitry of the components, reduces manufacturing costs, and enhances reliability by minimizing processing steps and circuit interfaces.

28 Claims, 5 Drawing Sheets

SYSTEM AND METHOD FOR USING A SINGLE INTELLIGENCE CIRCUIT FOR A PLURALITY OF IMAGING RENDERING COMPONENTS

CROSS REFERENCE TO RELATED APPLICATIONS

This application is a continuation-in-part of application Ser. No. 08/956,989 filed Oct. 23, 1997, and entitled "System and Method For Using a Single Intelligence Circuit in Both a Digital Camera and Printer".

BACKGROUND OF THE INVENTION

This invention generally relates to a system and method for using a single intelligence circuit for a plurality of imaging components. It is specifically concerned with the use of a single portable intelligence module for performing image data processing and memory operations in both image capturing components, such as a digital camera, and image rendering components, such as printers, digital photo albums, digital projectors, etc., in order to simplify the circuitry and reduce the cost of manufacturing such components.

Techniques for sharing an intelligence circuit between the electronic components used in digital imaging systems are known in the prior art. For example, in the camera system disclosed in U.S. Pat. No. 5,506,617, and assigned to the Eastman Kodak Company, a digital camera is provided as a module that attaches to the signal bus of a PC compatible computer. This system advantageously eliminates the need for a separate intelligence circuit to be incorporated within the camera itself, as the camera in this system can utilize the processor of the computer by way of a PC-compatible interface connector that mates with a bus extension connector on the computer. Digitized data is directly transmitted from the camera to the signal bus of the computer so that the processor of the computer can be used to perform all image processing, storage, and display functions. The elimination of the camera intelligence circuit not only simplifies the circuit architecture, but substantially reduces camera manufacturing costs as the microprocessor used in such circuits costs between $20.00 and $40.00 depending upon the speed and operating abilities required.

While the camera-computer system disclosed in the '617 patent represents a significant advance in the simplification of digital camera circuitry, its utility is limited since the digital camera must be continuously connected to the PC compatible computer during both the capturing and displaying of images. This limitation would still be present no matter how one attempted to apply the basic idea behind the '617 patent to other image rendering components, such as digital photo albums, digital projectors, scanners, image transfer stations, video phones, digital photo printers, etc. In each case where the intelligence circuit of one or more of the aforementioned imaging components is replaced by the processor of a single PC compatible computer, the component must be inconveniently tethered to a computer which is relatively unportable. Moreover, as the operating software for each type and model of imaging component is different, some sort of technique for providing the PC compatible computer with appropriate software instructions for each component would have to be implemented.

Clearly, there is a need for a system in which a single portable intelligence module that can be conveniently plugged into both image capturing components, such as digital cameras, and a plurality of different types of image rendering components, such as printers, digital photo albums, digital projectors, etc., in order to simplify the structure of the circuitry used in each imaging component of the system. Ideally, the intelligence module would have the capacity of immediately recognizing the particular type and model of imaging component that it was plugged into, and of executing the particular type of software necessary to operate that particular component for a broad range of imaging components. Finally, it would be desirable if the intelligence module had the capability of both storing and displaying image data received from any one of the imaging components to conveniently afford the system operator with a broad range of image monitoring capabilities and editing options.

SUMMARY OF THE INVENTION

Generally speaking, the invention is an electronic imaging system that overcomes all of the aforementioned limitations that comprises first and second imaging components, each of which requires an intelligence circuit for operation, and an intelligence control module detachably connectable to either of the imaging components for providing the required control circuit. The first component converts an image (which may be composed of light that is visible or invisible to the human eye) into image data, the intelligence module stores the data, and the second component converts the data into an image.

The intelligence module may include a microprocessor for performing the intelligence function required by the imaging components, and a memory circuit for storing the image data generated by the first component. The memory circuit may be detachably connectable to the control module in order to vary the memory capacity of the module. While the memory circuit is preferably formed from a flash memory card, it may also be an optical or magnetic memory.

Preferably, each of the imaging components includes a memory for storing a set of component operating instructions and the microprocessor of the intelligence module downloads the operating instructions whenever it is detachably connected to a particular imaging component in order to operate the same. To facilitate the operation of the system, the control module preferably includes a screen for displaying images constructed from the image data stored therein.

The first component of the electronic imaging system may be a digital camera having a photoelectric unit for converting an image into a stream of image data. The second imaging component can be any one of a number of devices for converting image data into an image, such as a printer, a digital photo album, a digital projector, a scanner, an image transfer station, a video phone, a digital photo printer, a computer video screen, or even a global positioning system imaging device. The system may further comprise a telephone connection that includes a video modem for conducting the image data to or from the intelligence module and an image capturing or image rendering component.

The invention also encompasses a method for generating an image by means of said first and second imaging components and an intelligence module. The system comprises the steps of connecting the intelligence module to a first image capturing component to convert an image into a set of stored image data, disconnecting the module from the first component, and connecting the module to the second component to convert the set of stored image data into a rendered image. In the method of the invention, each of the first and second imaging components includes a memory circuit for storing a set of component operating instructions, and the method further may include the step of downloading the set of component operating instructions into the intelligence module when the module is connected to one of the imaging components.

Both the system and the method advantageously simplify the circuitry of the components used in digital imaging systems to substantially reduce manufacturing costs with enhanced reliability and little or no trade offs in convenience or operational abilities. The sharing of an intelligence circuit among various imaging components advantageously lowers equipment costs.

DETAILED DESCRIPTION OF THE INVENTION

Figure 1:
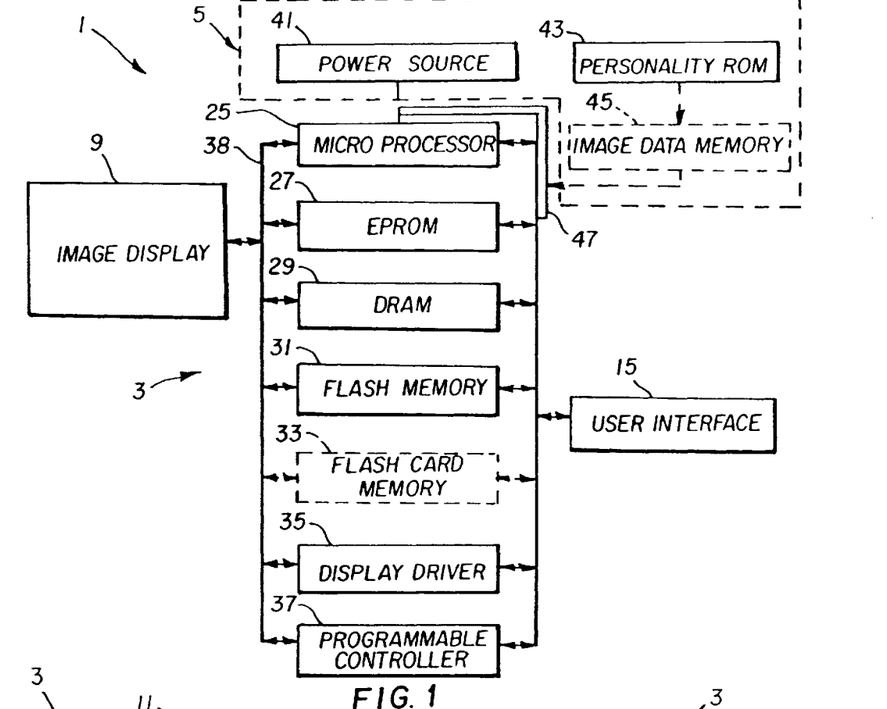
FIG. 1 is a schematic diagram of the system of the invention, illustrating the intelligence module in combination with an imaging component.
Figure 2A:
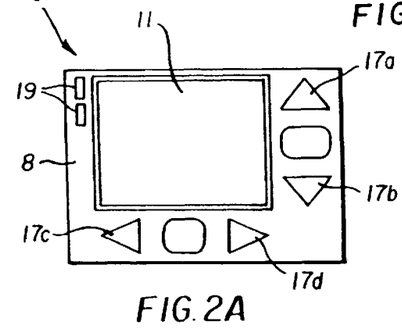
FIGS. 2A, 2B, and 2C are front, back, and bottom views of the intelligence module of the system.
Figure 2B:
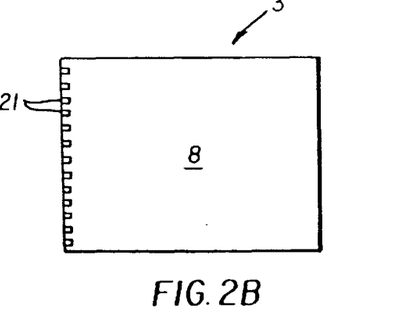

With reference now to FIGS. 1 and 2A–2C, the system 1 of the invention generally comprises an intelligence module 3 in combination with an imaging component 5. The exterior of the intelligence module 3 includes a rectangular housing 8 having an image display assembly 9 in the form of a liquid crystal display (LCD) screen 11. In the preferred embodiment, the LCD screen is a low temperature, polysilicon-type screen, as such screens can be made with an overall thickness of approximately 1 millimeter and therefore not significantly contribute to the overall thickness of the rectangular housing 8. Screen 11 is illuminated via a back light panel 13 in a manner well known in the art. Beside and below the screen 11 is a user interface 15 in the form of push buttons 17a–d. These push buttons allow the system operator to actuate the module 3 and display a desired image on the screen 11, and to scroll backwards and forwards with respect to a set of images reserved in the memory of the module 3. An LED display 19 is provided for informing the system operator when the intelligence module 3 has been turned on. An interface connector assembly 21 is provided along the edge of the back face of the housing 8, as is best seen in FIG. 2B. Finally, a flash card socket 22 is provided along the bottom surface of the rectangular housing for receipt of a flash memory card, as will be explained in more detail hereinafter.

The interior of the intelligence module 3 includes a printed circuit board assembly 23 upon which a microprocessor 25 is mounted. Preferably, the microprocessor 25 is one of the commercially available family of reduced instruction set computers (known as RISC-type processors) that are relatively fast, math intensive, and application-specific. Examples of such processors include the Model 821 Power PC manufactured by Motorola Corporation located in Phoenix, Ariz., and the Model MIPSR-4000 processor manufactured by NEC Electronics located in Tokyo, Japan. Such processors are fully capable of rapidly implementing the JPEG still image compression, decompression, and processing algorithms used in both image capturing and image rendering components. The printed circuit board assembly 23 further includes an EPROM 27 for storing an initialization program for the microprocessor 25. Generally, the initialization program is started whenever the circuit on the board assembly 23 first receives electrical power as a result of the module 3 being plugged into a component 5. As will be explained in more detail hereinafter, the program stored in the EPROM 27 then proceeds to instruct the microprocessor 25 to read the contents of the personality ROM 43 present in each one of the imaging components 5 of the entire system 1.

The circuit on the board assembly 23 further includes a dynamic random access memory or DRAM. Preferably the DRAM 29 should have at least 20 megabyte capacity in order to store the working image and data executable program downloaded from the personality ROM of the component. Examples of commercially available integrated circuits which can be used as the DRAM 29 include the Model MCM51LXXX DRAM manufactured by Motorola, or one of the series of AMD29C 600 DRAMs manufactured by Advanced Micro Devices located Beaverton, Oreg. In both cases, a total of two, 8 megabyte ICs may be used.

The circuit on the board assembly 23 should further include a flash memory 31 which preferably has at least a 16 megabyte capacity. The flash memory 31 is a non-volatile memory which may be used to store image data processed by the microprocessor 25 when the intelligence module 3 is connected to a power source. Advantageously, the stored image data remains in the flash memory 31 after the module is detached from a power source. A 16 megabyte memory can store either 5 megapixel images in flash or up to 50 JPE6 compound images. A flash memories 31 having the requisite capacities are commercially available from any one of a number of vendors, including an AM29F200 IC manufactured by the AMD Corporation located in Sunnyvale, Calif. If such a component were used, eight 2 megabyte IC's could be installed on the board assembly 23.

Figure 2C:
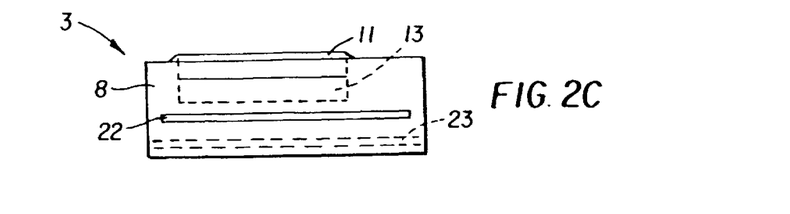

The intelligence module 3 may further include an optional flash card memory 33 which is detachably connectable to the printed circuit board assembly 23 via the previously mentioned socket 22. The provision of such a socket 22 advantageously allows the system operator to expand the capacity of the flash memory 31, which in turn allows the intelligence module 3 to store a greater amount of image data. In the preferred embodiment, at least one 10 megabyte Model No. SDCFB-10 flash card memory manufactured by the San Disc Corporation located in Santa Clara, Calif. 95054 is used.

The printed circuit board assembly 23 further includes both a display driver 35 for providing instructions to the LCD image display 9, and a mechanical programmable controller 37 for providing operational commands to the mechanical systems of the imaging component 5 (such as a lens focusing assembly, a printhead driver, etc.). The display driver 35 is normally part of the liquid crystal display module that forms the image on the display 9, while the mechanical programmable controller 37 may be an application system integrated circuit (ASIC) manufactured by the Eastman Kodak Company in accordance with known technology.

Finally, the circuit on the board assembly 23 includes an address data and input/output bus 38 for interconnecting all of the principal components 25, 27, 29, 31, 33, 35, and 37, as is schematically illustrated.

With respect reference again to FIG. 1, each of the imaging components 5 that the intelligence module 3 may be used in conjunction with a power source 41 used to power both the component 5 and the intelligence module 3 when the later is connected thereon, and a personality ROM 43. For each imaging component 5, the personality ROM 43 includes the software necessary to process the raw color filter array (CFA) image data read from the charge coupled device (CCD) imaging head, as well as the software necessary to operate any auto-focusing, zoom lens, or flash systems present in the camera. If the imaging component 5 is an image rendering component such as a digital camera or film scanner, it may optionally include an image data memory 45 which is separate from the personality ROM 43 for storing the image data received from the CCD imaging head. Such an optional image data memory 45 is not necessary in image rendering components, such as printers, since there is no need for such a component to separately store the data that it ultimately transcribes into an image. If the component 5 includes an additional, specialized microprocessor for operating a zoom lens or flash, the software contained in the personality ROM 43 of the component 5 instructs the microprocessor 25 of the module 3 how to coordinate its efforts with such a dedicated processor. Finally, the imaging component 5 includes an interface contact assembly 47 that interconnects with the previously mentioned interface contact assembly 21 of the intelligence module 3. The joining of the two contact assemblies 21 and 52 allows both power from the power source 41 and program instructions from the personality ROM 43 to enter the circuit of the intelligence module 3 where the program is executed.

Figure 3:
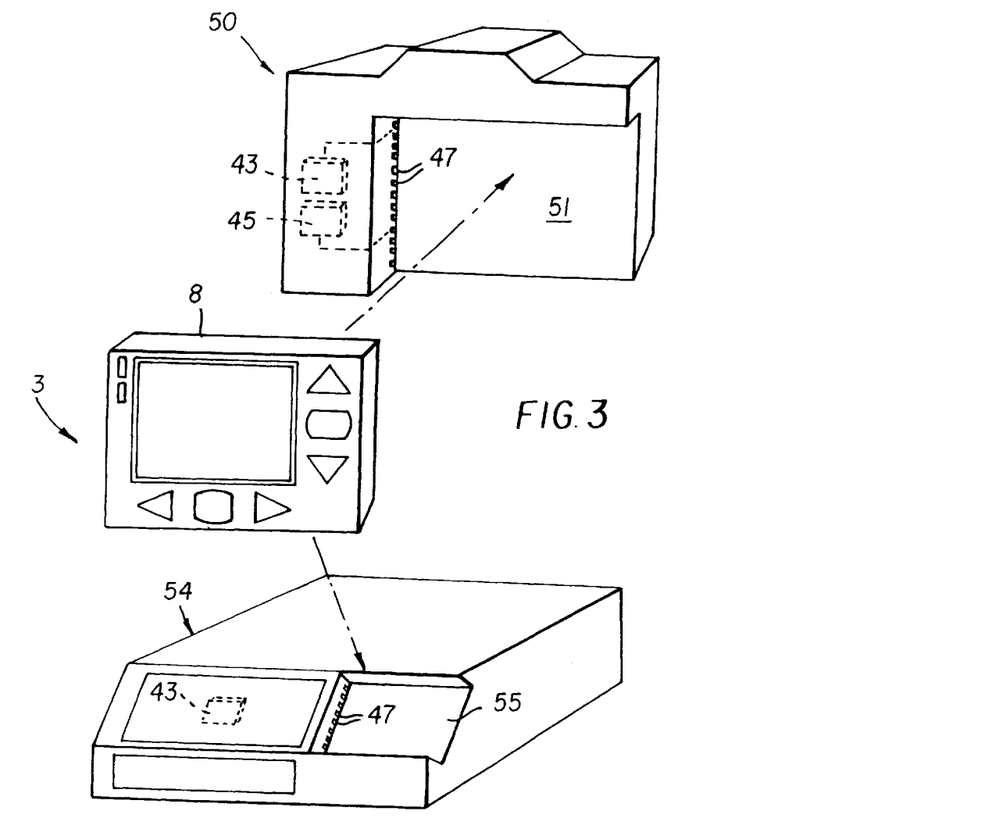
FIG. 3 is an exploded, isometric view of the intelligence module, a digital camera, and a digital printer, schematically illustrating how the camera and the printer share the intelligence module.

FIG. 3 illustrates how that system 1 may be applied to the combination of a digital camera 50, and a printer 54. The digital camera 50 includes a recess or socket 51 for receiving the housing 8 of the intelligence module 3. When the intelligent circuit 3 is installed, its contact assembly 21 engages the contact assembly 47 of the camera 50, thereby interconnecting the circuit of the module 3 to the power source (not shown) of the digital camera 50, as well as its personality ROM 43 and image data memory 45. ROM 43 and memory 45 are shown as separate components, they may be combined into a single memory. A further embodiment, digital camera 50 may be, for example, a model DC 120 or 210 manufactured by Eastman Kodak Company located in Rochester, N.Y., modified so as to be "lobotomized" of the intelligent circuit that is normally present in this device.

Once the intelligence module 3 has been mechanically and electrically attached to the digital camera 50, the module 3 becomes actuated by the camera power source, and the microprocessor 25 downloads the operating program from the ROM 43 into its DRAM 29. As the camera 50 is being used, microprocessor 25 processes the raw CFA data read from the CCD imaging head of the camera by interpolating red, green or blue colors for each of the pixels as needed and by adjusting the resulting image with a scene balance algorithm (SBA), and then converting the resulting intermediate result into a photo RG13 color space encoding. The final image data is then J-PEG compressed by the microprocessor 25, and then converted into a standard imaging file format such as EXIF-R, where component is stored in the flash memory 31 or 33 of the intelligence module 3.

After the system operator has captured the desired images with the digital camera 50, he then detaches the module 3 from the camera body 50 and installs it in a complimentarily shaped socket 55 present in the digital printer 54. The disconnection of the DRAM 29 from the camera power source causes it "forget" the instructions received from the ROM 43 of the digital camera 50, so that the memory space can be reused to receive printer operating instructions from the personality ROM 43 located within the printer 54. The instructions contained within the printer personality ROM 43 instruct the microprocessor 25 as to how to decompress the J-PEG compressed images stored in the flash memory 31 of the module 3, and how to format the resulting decompressed image data into print instructions for this device. The printer 54 may be a model number DS8650 thermal printer manufactured by the aforementioned Eastman Kodak Company, appropriately "lobotomized" of the microprocessor that is normally present within this device, or any one of a number of prior art color or monochrome printers.

Figure 4:
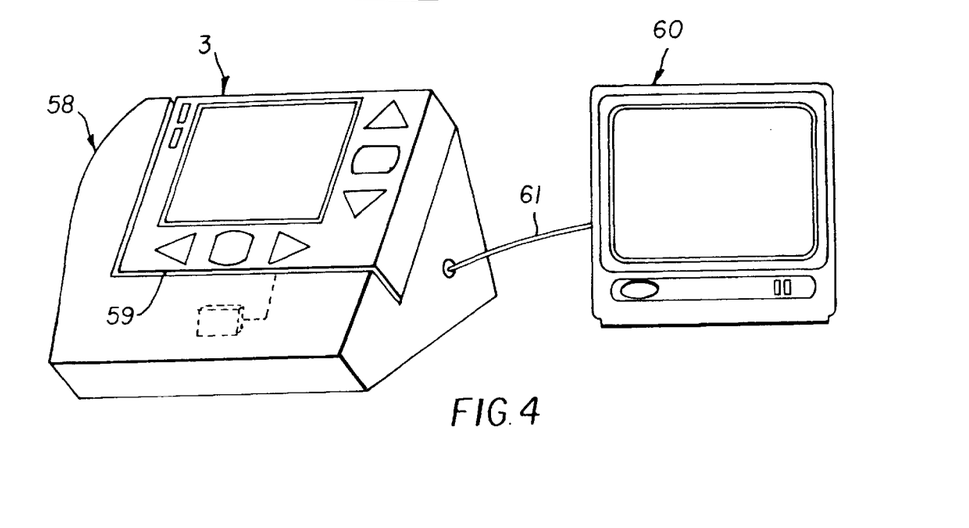
FIG. 4 illustrates the use of the intelligence module in combination with a video encoder connected to a video screen.

FIG. 4 illustrates how the intelligence module 3 may be used in combination with a video encoder 58 and video screen 60 interconnected by a cable 61. Like the previously described camera 50 and printer 54, video encoder 58 includes socket 59 for receiving the intelligence module 3 as well as a contact assembly 47 (not shown). In operation, the video encoder converts compressed images stored in the flash memory 31 of the intelligence module 3 into a video compatible transmission which is relayed to the video screen 60 via coaxial cable 61. Encoder 58, like the camera 50 and printer 54, likewise has a personality ROM 43 that includes instructions that are downloaded into the EPROM 27 of the intelligence module 3 when it is initially installed. In this case, the instructions present on the personality ROM 43 enable the microprocessor 25 to convert the image data stored in its flash member 31 into a video transmission. The circuitry of encoder 58 may be formed, for example, by an IC located in the base of the unit. Both video encoder and decoder ICs are commercially available as Model Nos. P/N BT 864 (encoder) and P/N BT829 (decoder) manufactured by the Brooktree Division of Rockwell Semiconductor Systems, Inc., located in San Diego, Calif.

Figures 5, 6:
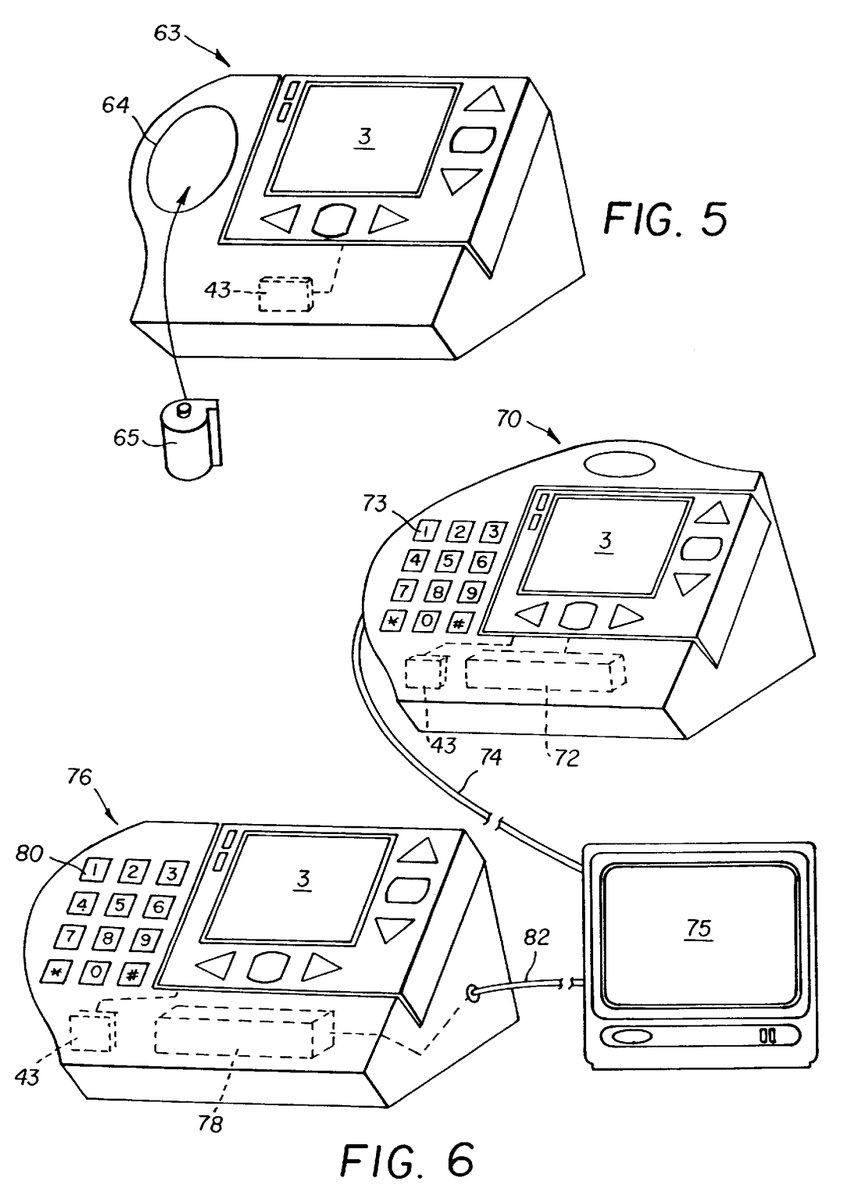
FIG. 5 illustrates the combination of the intelligence module of the invention and a film scanner.
FIG. 6 illustrates the intelligence module of the invention in combination with both a video phone and a video terminal in combination with a video screen.

FIG. 5 illustrates how the intelligence module 3 of the system 1 may be used in combination with a film scanner 63, such as the "Snap-Shot Photo Scanner" manufactured by the Eastman Kodak Company. Scanner 63 includes an opening 64 for receiving an APS color negative developed film cartridge 65. Scanner 63 includes, in its interior, a CCD imaging head (not shown) and a light source for converting the images contained on the film 65 into sampled RGB digital image data. The operational instructions contained within its particular personality ROM 43 enable the microprocessor 25 of the intelligence module 3 to process the raw image data generated by the scanner's linear array CCD in much the same way as previously described with respect to the digital camera 50, the primary difference being that provisions in the software are made to convert negative images from the film 65 into positive ones in the event that the film 65 is developed, negative film. The scanner can likewise handle positive reversed film. The resulting positive images may be displayed on the LCD 11. Alternatively, the resulting images may further be stored in the local flash memory 31 of the intelligence module 3 or the removable flash card memory 33 for rendering by either the previously mentioned printer 54, for display on a screen such as the previously described video screen 60.

FIG. 6 illustrates how the intelligence module may be used in conjunction with both a video telephone 70, a video terminal 76, and remotely located video screen 75. The video telephone 70 also includes, in addition to the usual auditory-type equipment, a video conversion circuit such as the one discussed with respect to the video encoder 58, and the modem 72 for converting the resulting video signals into signals compatible with a transmission over a telephone line 74. Video telephone 70 includes the usual keyboard 73 for remotely dialing the location of a video screen 75. Video terminal 76 is in many respects identical to the previously discussed video encoder 58, the primary difference being the addition of a modem 78 and keypad 80 for converting the video-type image data into data transmittable over a telephone cable 82. Both the video telephone 70 and video terminal 76 each include personality ROMs 43 for enabling the microprocessor to convert the image data stored in its flash memory 31 first to video signals, and then to telephone-line compatible signals via the modems 72 and 78.

Figure 7:
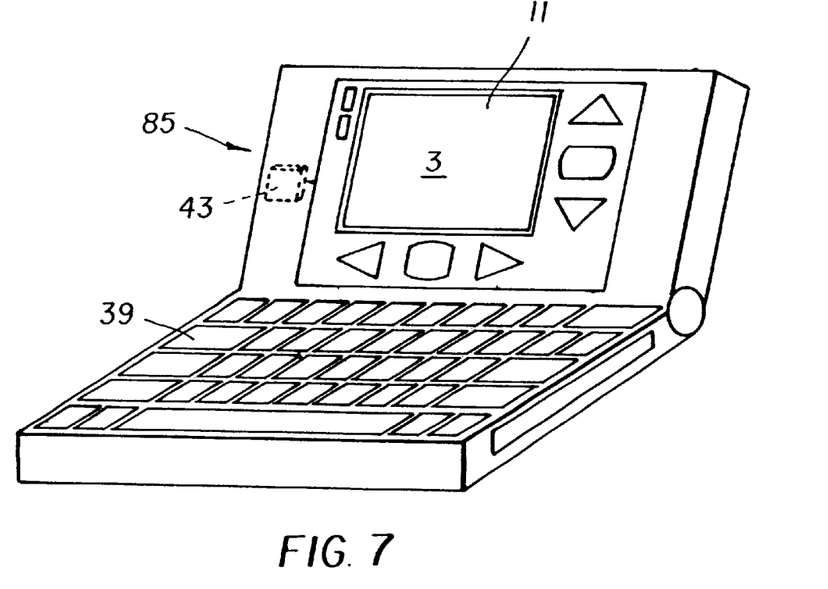
FIG. 7 illustrates how the intelligence module may be used in combination with a personal digital assistant.

FIG. 7 illustrates the combination of an intelligence module 3 with a personal digital assistant 85. In this particular combination of the system of the invention, the LCD screen 11 of the intelligence module 3 serves as a screen for the personal digital assistant (PDA). The PDA includes the usual keyboard 89 for the typing of alpha-numeric information.

Figure 8:
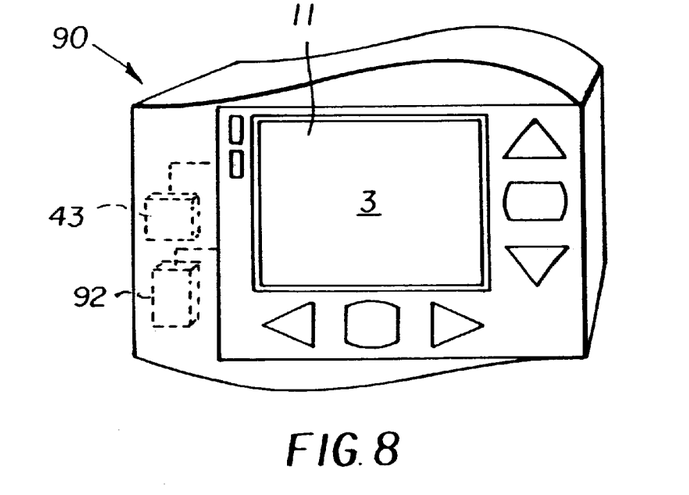
FIG. 8 illustrates the combination of the intelligence module with a digital photo album.

FIG. 8 illustrates the system 1 in terms of the combination of the intelligence module 3 and a device 90 which the inventors refer to as a digital photo album. The digital photo album 90 includes the usual personality ROM 43, and a battery pack 92 for powering the intelligence module 3. The sole purpose of the digital photo album 90 is to supply sufficient power via the battery pack 92 and sufficient operating software via the personality ROM 43 so as to allow the intelligence module 3 to display on its LCD screen 11 images stored within its flash memory 31.

Figure 9:
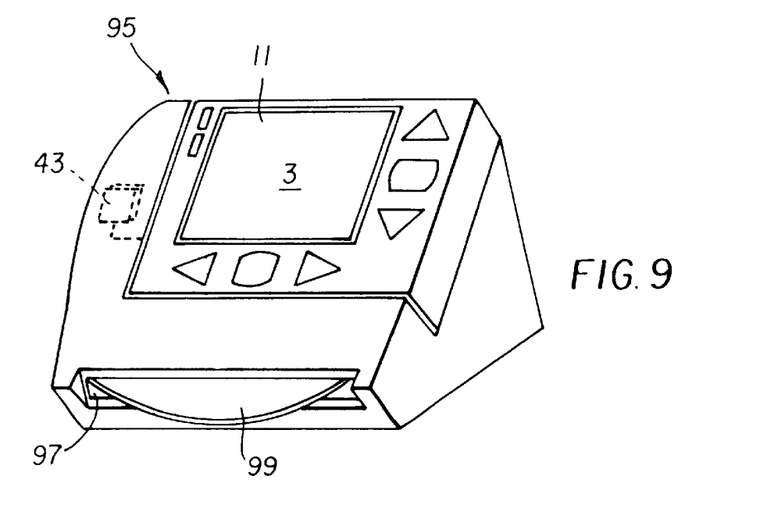
FIG. 9 illustrates the combination of the intelligence module with an archive station.

FIG. 9 illustrates the system 1 of the invention in terms of the combination of the intelligence module 3 in combination with a device which the inventors have termed an archive station 95. Archive station 95 includes a slot 97 for the receipt of a recordable optical disk 99 that stores image data. Its particular personality ROM 43 includes instructions that enable the microprocessor 25 to copy images stored in the intelligence module's flash memory to an organized directory structure on the optical disc 99. Images are browsed on the LCD display and selected for copy using module buttons 17a–d.

Figure 10:
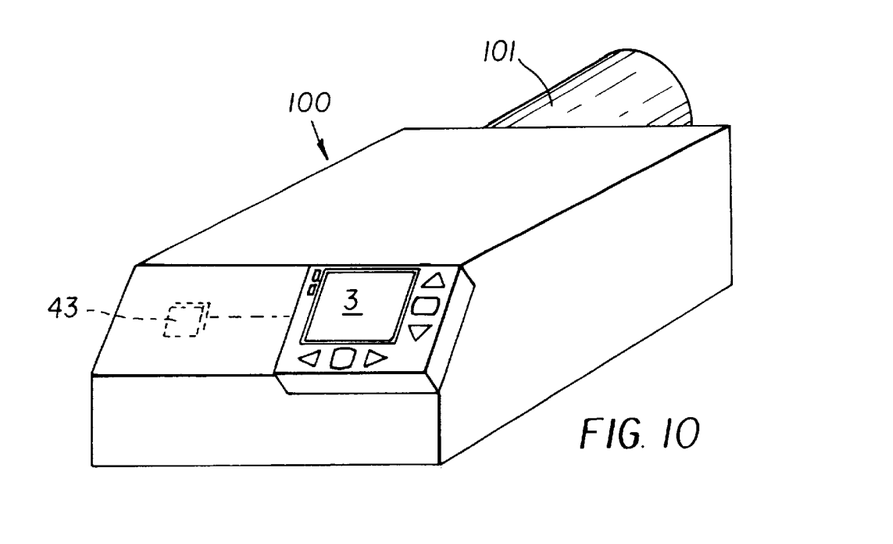
FIG. 10 illustrates the combination of the intelligence module with a digital projector.

Finally, FIG. 10 illustrates the system 1 of the invention as a combination of the intelligence module 3 with a digital projector 100, such as the Model No. LP 740 unit manufactured by In-focus located in Wilsonville, Oreg. Digital projector 100 converts image data stored in the flash memory 31 of the intelligence module 3 into an image which is projected via lens assembly 101 onto a screen (not shown).

As a further example, the system 1 may be used in combination with global positioning systems (GPS) which have the capability of rendering a vertical display of the terrain surrounding a given location. In such a combination, the LCD screen 11 of the module 3 would provide the terrain display, and the microprocessor 25 of the module 3 would execute the software contained in a personality ROM 43 contained within the housing of such a GPS. An example of such a GPS device that the system might be used within the housing of such a GPS. An example of such a GPS device that the system might be used within a "lobotomized" GPS 4000 Excel manufactured by Magellan Systems Corporation, a division of Orbital Access Co. located in Dulles, Va.

From the foregoing, it is clear that the system 1 of the invention encompasses virtually any known combination of image capturing and image rendering components. While the system 1 has been described with respect to the specific image capturing and rendering components illustrated in FIGS. 3–10, the system is, of course, applicable to any type of image capturing or rendering device that requires an intelligence circuit or microprocessor for operation.

PARTS LIST

1. System
3. Intelligence module
5. Imaging component
7. [Intelligence module]
8. Rectangular housing
9. Image display assembly
11. Liquid crystal screen
13. Backlight panel
15. User interface
17. Push buttons a–d
19. LED display
21. Interface contact assembly
22. Hash card socket
23. Printed circuit board assembly
25. Microprocessor
27. EPROM
29. DRAM
31. Flash memory
33. Optional flash card memory
35. Display driver
37. programmable controller
38. Bus connections
39. [Imaging component]
41. Power source
43. Personality ROM
45. Optional image data source
47. Input contact assembly
50. Digital camera
51. Socket
52. Input contact assembly
54. Printer
55. Socket
58. Video encoder
59. Socket
60. Video screen (computer)
61. Cable
63. Film scanner
64. Slot
65. Film canister
70. Video telephone 72. Video modem
73. Keyboard
74. Telephone cable
75. Video screen
76. Video terminal
78. Video modem
80. Keyboard
82. Telephone cable
85. Personal digital assistant
87. Display panel
89. Keyboard
90. Digital photo album
92. Battery pack
95. Archive station
97. Slot
99. Optical disc
100. Digital projector

What is claimed is:

1. An electronic imaging system, comprising:
first and second imaging components, each of which requires a microprocessor for operation and each of which is without a microprocessor and wherein each of said first and second imaging components includes a respective memory for storing a set of respective component operating instructions, said first imaging component comprising a digital camera that generates image data of an image captured by the digital camera and said second imaging component comprising a printer that is adapted to print images; and
an intelligence module detachably connectable to either of said first and second imaging components for providing the required microprocessor, wherein said microprocessor performs a respective intelligence function for each of the first and second imaging components in response to respective operating instructions from the respective memory and the intelligence module including a memory circuit for storing the image data generated by said first component, and further wherein said component operating instructions stored in said memory of the first imaging component comprises a software program necessary to process raw image data captured by the first imaging component.

2. The electronic imaging system of claim 1, wherein said memory circuit includes one of a flash, optical, or magnetic memory.

3. The electronic imaging system of claim 1, wherein said second component converts said data into an image.

4. The electronic imaging system of claim 2, wherein said memory circuit is detachably connectable to said intelligence module.

5. The electronic imaging system of claim 3, wherein said control module further includes a screen for displaying an image constructed from said image data.

6. The electronic imaging system of claim 3, wherein said system comprises a plurality of second imaging components.

7. The electronic imaging system of claim 1, wherein said first component is a camera having a photoelectric unit for converting an image into a stream of image data and said second component converts said image data into an image.

8. The electronic imaging system of claim 7, wherein said second component is a digital printer.

9. The electronic imaging system of claim 8, wherein said intelligence module is connected to a third component and the third component is a digital photo album.

10. The electronic imaging system of claim 8, wherein said intelligence module is connected to a third component and the third component is a digital projector.

11. The electronic imaging system of claim 8, wherein said intelligence module is connected to a third component and the third component is a scanner.

12. The electronic imaging system of claim 8, wherein said intelligence module is connected to a third component and the third component is a transfer station.

13. The electronic imaging system of claim 8, wherein said intelligence module is connected to a third component and the third component is a video phone.

14. The electronic imaging system of claim 1, wherein said second component is a digital photo printer.

15. The electronic imaging system of claim 14, wherein said intelligence module is connected to a third component and the third component is a computer video screen.

16. The electronic imaging system of claim 14, wherein said intelligence module is connected to a third component and the third component is a global positioning system imaging device.

17. The electronic imaging system of claim 8, further comprising a telephone connection including a modem for conducting said image data to one of said control module and said second imaging component.

18. An electronic imaging system comprising:
an image capturing component and at least one image rendering component, each of which includes a component memory for storing a set of component operating instructions in the form of a program, and each of which requires an intelligence circuit in the form of a microprocessor for operation and each of which is without a microprocessor, and
an intelligence module detachably connectable to any one of said components, the intelligence module including a microprocessor and said microprocessor when attached to a respective component being responsive to said set of component operating instructions from said component memory and for providing the required intelligence circuit for operating said component in accordance with said instructions.

19. The electronic imaging system of claim 18, wherein said image capturing components converts an image into image data, and wherein said intelligence module includes a memory circuit for storing said image data and said downloaded set of component operating instructions, and a microprocessor for executing said operating instructions.

20. The electronic imaging system of claim 18, wherein said system includes a plurality of second imaging components.

21. The electronic imaging system of claim 20 and wherein the intelligence module includes:
a housing including a front face having an image display assembly;
an image display within the image display assembly for displaying a visual image of a digital photo image;
a display driver connected to the image display;
a random access memory for storing at least one digital photo image;
a microprocessor connected to the random access memory and the display driver, for controlling the display of the digital photo image on the image display;
a first non-volatile memory for storing a program for execution by the microprocessor;
a second non-volatile memory for storing a plurality of digital photo images;

a user interface; and a telephone modem connected to the microprocessor; wherein the modem is adapted to receive the plurality of digital photo images transmitted over a telephone line, the microprocessor controls the second non-volatile memory to store the plurality of digital photo images in the second non-volatile memory, and the user interface controls the microprocessor in order to scroll backwards and forwards to view the plurality of digital images stored in the second non-volatile memory.

22. The electronic imaging system of claim 21 wherein the second non-volatile memory is in the form of a flash memory card, and wherein the apparatus further includes a socket for receiving the flash memory card.

23. The electronic imaging system of claim 21 wherein the microprocessor decompresses the digital images prior to display.

24. The electronic imaging system of claim 23 wherein the microprocessor provides JPEG still image decompression.

25. The electronic imaging system of claim 21 wherein the microprocessor is a RISC processor.

26. The electronic imaging system of claim 21 wherein the user interface includes pushbuttons adjacent at least two different sides of the image display.

27. A method for generating an image by means of a first imaging component for converting an image into image data and a second imaging component for converting image data into an image, and an intelligence module having a microprocessor, the intelligence module being detachably connectable to one of said first and second components for operating the same, comprising the steps of:

connecting said intelligence module to said first component and downloading instructions in the form of a program from a first memory in said first component to said microprocessor to operate the first component and to convert an image captured by the first component into a set of stored image data that is stored in said intelligence module;

disconnecting said intelligence module from said first component, and connecting said intelligence module to said second component and downloading instructions in the form of a program from a second memory in said second component to said microprocessor to operate the second component and to convert said set of stored image data into an image.

28. The method as defined in claim 27, wherein each of said first and second memories includes a memory circuit for storing a set of component operating instructions, and further comprising the step of downloading said set of component operating instructions into said intelligence module when said control module is connected to one of said first and second components.

* * * * *